July 4, 1950   E. T. FISK   2,513,465
WORLD TIME INDICATOR
Filed Jan. 22, 1945   2 Sheets-Sheet 1
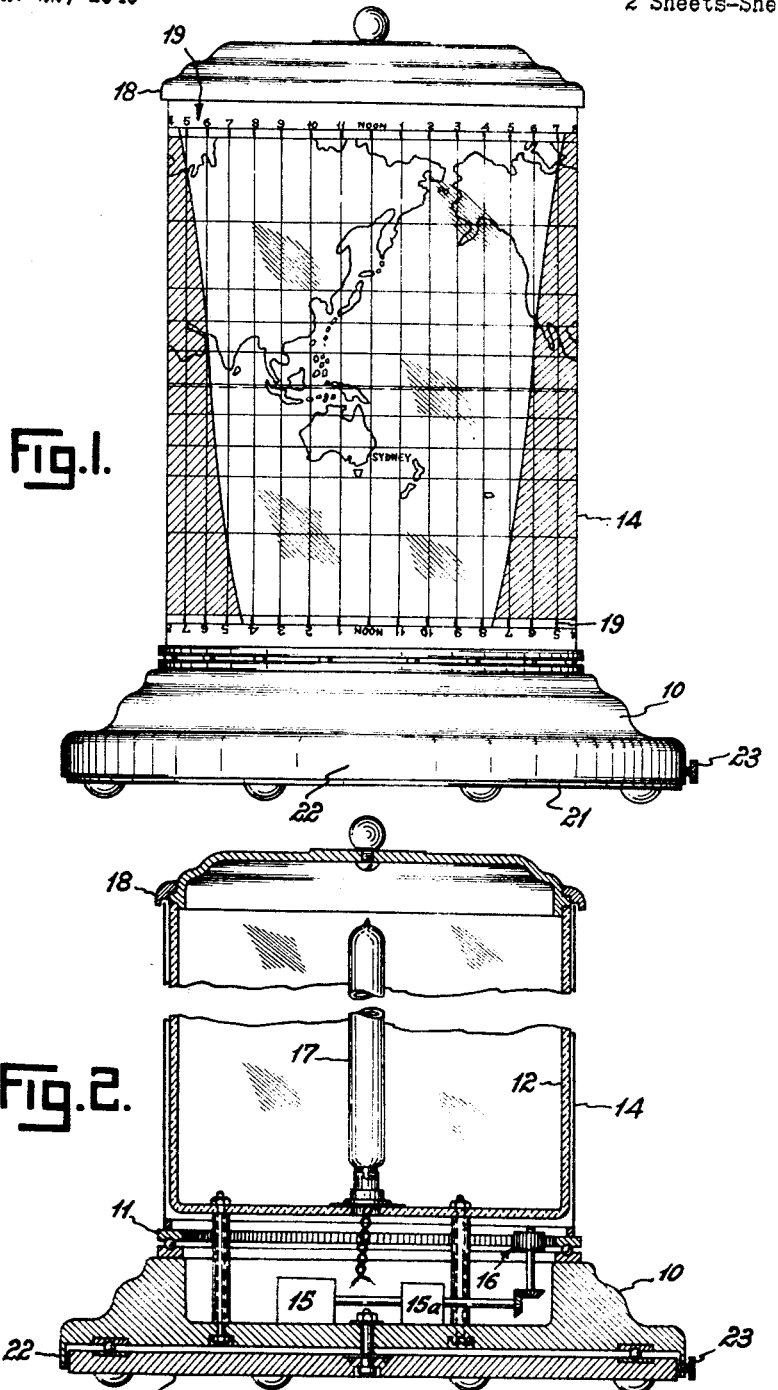
Inventor
E. T. Fisk July 4, 1950              E. T. FISK              2,513,465

WORLD TIME INDICATOR

Filed Jan. 22, 1945              2 Sheets-Sheet 2

Inventor
E. T. Fisk

Patented July 4, 1950

2,513,465

UNITED STATES PATENT OFFICE 2,513,465

WORLD TIME INDICATOR

Ernest Thomas Fisk, Sydney, New South Wales, Australia

Application January 22, 1945, Serial No. 573,999
In Australia February 10, 1944

1 Claim. (Cl. 58—44)

This invention relates to devices for indicating instantaneous relative world times, i. e. for indicating the time at any position in the world with respect to the instantaneous time at any other position. Provision is also made for simultaneously indicating that portion of the earth's surface which is in darkness at any time of the day and at any season of the year.

Briefly, a device according to the subject invention comprises a cylindrical surface bearing a map of the world provided with latitude and longitude markings, said cylindrical surface having rotatably mounted thereabout a transparent screen in the form of a screen member provided with clear and shaded portions representing day and night respectively, said screen also having peripherally marked thereon a time scale correctly located in relation to said clear and shaded portions so that midnight on said scale corresponds with the longitudinal median line of the shaded portion.

In accordance with one practical embodiment there is provided a cylinder of wood, metal, moulded plastic or other suitable material and to the exterior surface of which there is applied a map of the world having the usual latitude and longitude markings which may be located at 15 degree intervals.

A transparent cylindrical sleeve in the form of a screen, having shaded and clear portions contoured to indicate the areas of the earth's surface which are in darkness and daylight, is snugly and rotatably mounted about the map cylinder, the top and bottom edges of said screen being marked off in hours scales, said scales being correctly related with the shaded portion of the screen so that the edges of the shading indicate sunrise and sunset and the longitudinal median line of said shading represents midnight.

If desired, the screen member may be mounted on a freely-rotatable member adapted to be driven by means of a spring or electric clock motor whereby rotational movement, in synchronism with the passage of local time, is continuously imparted to said screen.

Further, the map bearing cylinder may be constituted of transparent or translucent material to enable the device to be illuminated from the interior.

However, for a more complete understanding of the invention, an exemplary embodiment thereof will now be described with reference to the accompanying drawing wherein:

Figure 1 is an elevation of a device in accordance with said embodiment.

Figure 2 is a vertical section (broken) of the device of Figure 1 and

Figure 3:
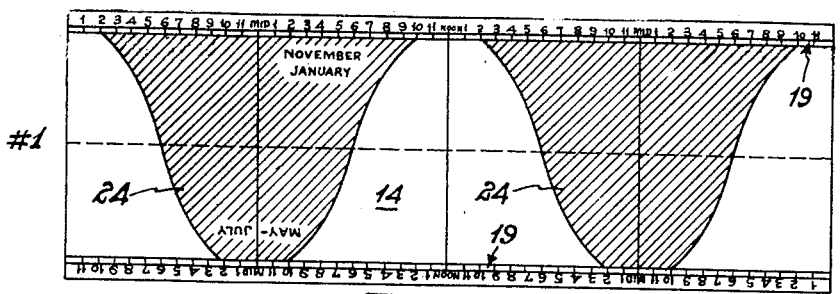
Figures 3, 4, 5 and 6 are flat views (drawn to a reduced scale) of a series of shadow screens for use with the device of Figures 1 and 2.

Referring now to these drawings, 10 is a circular base on which is mounted a cylinder 12, preferably of transparent or translucent material, the external surface of which carries a world map. In the illustrated example the map is a Mercator's cylindrical projection extended to include 720 degrees of longitude marked off in 15-degree divisions. A second cylinder or sleeve 14 of transparent material and having a diameter slightly greater than that of cylinder 12 is rotatably and concentrically mounted with respect to said cylinder 12. The peripheral edges of rotatable sleeve 14 are marked off with 48 equally spaced divisions arranged to correspond with the 15-degree divisions of longitude on the map which is visible through sleeve 14, said divisions being divided into four groups each of twelve hours constituting a time scale 19. Since there are 48 divisions, each representing one hour, the sleeve 14, if mechanically driven, should be rotated at a speed of one revolution in 48 hours. Any convenient and known means may be provided for effecting this rotation, such as an electric or spring clock motor, suitably geared in this instance to effect one revolution in 48 hours.

Driving mechanism, indicated diagrammatically at 15 is housed within the base 10, drive to the sleeve 14 being imparted by means of rack and pinion gear 16 between which latter and the motor 15 there is interposed a clutch device 15a.

The lower edge of sleeve 14 rests on bearing ring 11 which is shown as the upper member of a ball race but which latter may be any other suitable type of bearing.

An electric lamp 17 may be mounted within the translucent cylinder 12, above the driving mechanism 15, to illuminate the map and the concentrically mounted sleeve or screen 14.

The flange 18 on the upper end of cylinder 12 is detachable to enable the rotatable sleeve 14 to be removed for substitution by other sleeves bearing, in addition to the time scale 19, other indicia such as shadow graphs, indicating those portions of the earth's surface which are at any instant in daylight and darkness, stars, moon, planets, etc.

Figure 4:
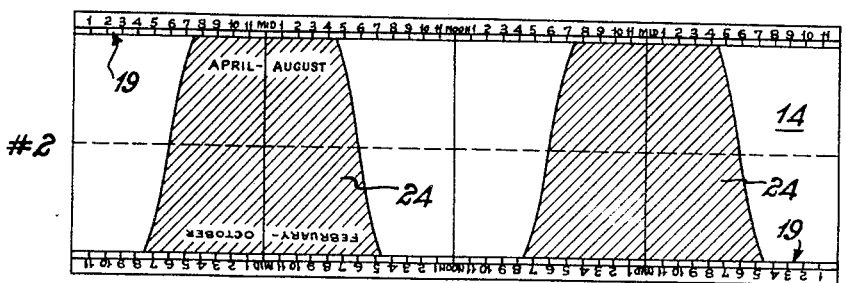
Figure 5:
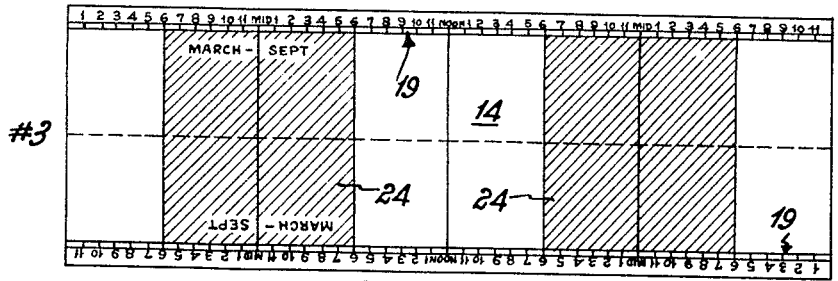
Figure 6:
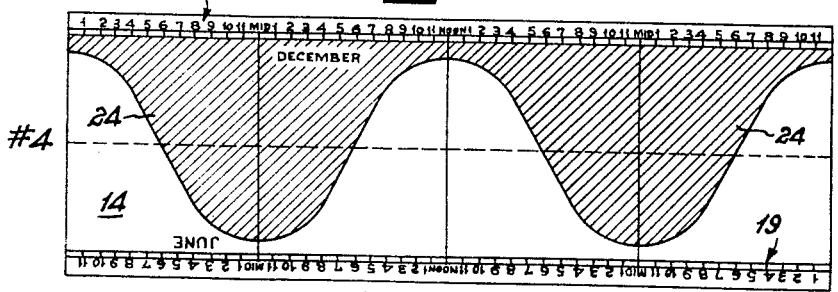

One example of a set of four cylinders bearing indicia useful to radio engineers, and navigators, will now be described with particular reference to Figures 3 to 6 of the accompanying drawings.

In order to show the daylight and darkness areas of the earth's surface, appropriate areas 24 of the transparent sleeve 14 are shaded to represent night.

As the shape of the shadow cast by the sun on a Mercator cylindrical projection map of the world will vary according to the seasonal declination of the sun, it is desirable to be able to vary the shape of the shaded areas 24.

This is accomplished, in accordance with the embodiment under discussion by providing a series of sleeves 14 whereon the areas 24 are correctly contoured for each month of the year. This may be achieved by the provision of four screens as follows:

Screen No. 1 (Figure 3) will bear a shadow contour for the months of January and November, and, when inverted, will provide the correct shadow contour for May and July.

Screen No. 2 (Figure 4) represents the shadow contour for April and August when the sun will be in the same relative position.

By inverting screen No. 2 the shadow contour will then be correct for the months of October and February, so that this one screen also serves for four separate months.

Screen No. 3 (Figure 5) represents the shadow contour at the equinoxes (September and March). The shadow on this screen is rectangular in shape, the shadow edges cutting the equator at right angles and consequently inversion is unnecessary.

Screen No. 4 (Figure 6) like the equinoctial screen No. 3 indicates the shadow contour for two months only, i. e. for December and when inverted for June, during which months the sun is at its greatest declination.

Other indicia, including the more important stars as mentioned heretofore, may be included on the sleeves or screens if desired.

In use, the time indicator device is operated as follows:

Normally the sleeve 14 is driven by the motor 15 to indicate the instantaneous time at any position on the earth's surface in relation to local time, daylight and darkness being defined by the clear and shaded areas of said sleeves.

If it is desired to ascertain the relative time at any two or more positions at a time other than the instant local time the driving mechanism 15 is disengaged by operation of the clutch 15a and the sleeve 14 may then be rotated by hand until the time scale thereon corresponds with the desired new settings. The relative time at any other longitude is then read off from the time scale 19.

By way of example assume the clock is being used in Sydney, Australia, at noon in the month of August. The "August" sleeve (see Figure 1) is selected and placed on the cylinder over the map and rotated until "noon" on the time scale corresponds with the longitude of Sydney. The indicator now shows the relative instantaneous times at any position in the world and also that portion of the earth's surface which is in darkness at this time, thus eliminating likelihood of ambiguity as to whether the time of any locality is day or night.

In addition to its use as a time indicator, a device embodying the instant invention is useful to radio engineers in studying the daylight-darkness conditions of the earth's surface over the great circle paths of radio communication channels.

The cylinder may be mounted vertically on a suitable base and, being fitted with a detachable top in the form of a lid, those screens not in use at any time may conveniently be housed within the cylinder in cases where it is not desired to provide interior illumination.

To enable the entire device to be easily rotated the base 10 may be pivotally mounted on the sub-base 21 as illustrated in Figure 2 and in order to lock the device in any adjusted position in relation to the sub-base, the depending flange 22 of base 10 may be fitted with a setscrew 23 adapted to engage with the periphery of sub-base 21.

It will be obvious that, as an alternative to the example herein described, the map cylinder may be mounted for rotation within a stationary time scale cylinder.

I claim:

A device for indicating world apparent time comprising a cylinder having on its surface a world map, a screen in the form of a second transparent cylinder of slightly larger diameter than the first mentioned cylinder rotatably mounted in concentric relation to said first cylinder and having marked thereon a time scale adapted to register with longitude markings on said map to indicate apparent time and also having clear and shaded portions for indicating those portions of the earth's surface which are in daylight and darkness, driving means for said second cylinder and means for disengaging said driving means to enable manual rotation of said second cylinder.

ERNEST THOMAS FISK.

REFERENCES CITED

The following references are of record in the file of this patent:

UNITED STATES PATENTS

| Number | Name | Date |
|---|---|---|
| 434,137 | Plechawski | Aug. 12, 1890 |
| 1,015,195 | Kretzschmar | Jan. 16, 1912 |
| 1,959,831 | Krzeminski | May 22, 1934 |
| 2,036,046 | Harrison | Mar. 31, 1936 |
| 2,099,518 | Hazlett | Nov. 16, 1937 |
| 2,300,621 | Dupler | Nov. 3, 1942 |